United States Patent
Hsieh et al.

(10) Patent No.: US 7,983,510 B2
(45) Date of Patent: Jul. 19, 2011

(54) NOISE REDUCTION DEVICE AND METHOD

(75) Inventors: Tung-Lin Hsieh, Tao Yuan Shien (TW); Ming-Horng Shiu, Tao Yuan Shien (TW); Chin-Kang Chang, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 842 days.

(21) Appl. No.: 12/010,704

(22) Filed: Jan. 29, 2008

(65) Prior Publication Data
US 2009/0010565 A1  Jan. 8, 2009

(30) Foreign Application Priority Data
Jul. 6, 2007  (TW) .............................. 96124696 A

(51) Int. Cl.
*G06K 9/40* (2006.01)
(52) U.S. Cl. ........................................ 382/275; 382/254
(58) Field of Classification Search .................. 382/275, 382/254, 236; 348/220.1, 208.4, 208.6, 208.13, 348/241; 358/463, 443
See application file for complete search history.

(56) References Cited

U.S. PATENT DOCUMENTS

| | | | |
|---|---|---|---|
| 7,176,982 B2 * | 2/2007 | Zhu et al. ...................... | 348/620 |
| 7,375,760 B2 * | 5/2008 | Kempf et al. ................. | 348/441 |
| 7,903,179 B2 * | 3/2011 | Morino ........................ | 348/701 |
| 2008/0002063 A1 * | 1/2008 | Kimura et al. ................ | 348/607 |

* cited by examiner

*Primary Examiner* — Yon Couso
(74) *Attorney, Agent, or Firm* — Thomas|Kayden

(57) ABSTRACT

The invention discloses a noise reduction device for adjusting gray levels of a video sequence to reduce noises. The noise reduction device of the invention includes a motion detector and a first noise reduction module. The motion detector is used for determining whether an inputted pixel is a motion pixel or a static pixel. If the pixel is a motion pixel, the first noise reduction module directly outputs the pixel without adjustment. If the pixel is a static pixel, the first noise reduction module adjusts the gray level of the pixel according to previous image frame. Because the invention only stores previous image frame, and does not utilizes multiple continuous image frames to adjust the present image frame. Therefore, the display system of the invention needs only to be installed with one buffer, and hardware resource can be further saved.

12 Claims, 6 Drawing Sheets first ⎯⎯⎯⎯ a sequence of displaying image frames ⎯⎯⎯⎯▶ last

NOISE REDUCTION DEVICE AND METHOD

BACKGROUND OF THE INVENTION

1. Field of the Invention

The invention relates to a noise reduction device and method, and particularly to a noise reduction device and method for reducing noises of a video sequence.

2. Description of the Prior Art

How to reduce noises of an image frame is a main issue of the flat display technique. When an image frame has noises, users will not be satisfied with the quality of the image frame. Generally, common video inferences (VIF) include interpreting signals, ripples of a video, and blocking effect of JPG/MPEG decompression.

Methods for reducing noises of an image frame include a 2D noise reduction (2DNR) method and a 3D noise reduction (3DNR) method. Generally, the 2DNR method utilizes multiple adjacent pixels in the present image frame to adjust the present image frame. The 3DNR method utilizes multiple continuous image frames to adjust the present image frame. The 2DNR method has an obvious disadvantage, which leads the detail of an image to become blurry. Although the 3DNR method does not have the disadvantage of the 2DNR method, the 3DNR method has disadvantages of ghosts and greater hardware resource requirement.

Please refer to FIG. 1A and FIG. 1B. FIG. 1A is a schematic diagram illustrating five continuous image frames of a video sequence. FIG. 1B is a schematic diagram illustrating an image frame superposed by the five image frames shown in FIG. 1A. As shown in FIG. 1A, according to the five continuous image frames, an object in these image frames is moving. Traditional 3DNR method utilizes a superposition of multiple image frames to reduce noises, so the ghosts is generated obviously shown in FIG. 1B after superposing multiple continuous image frames shown in FIG. 1A. The ghosts are generated easily if the image frames change rapidly, for example, fast movement, dissolving, disappearing, and so on. Additionally, the 3DNR method utilizes multiple continuous image frames to adjust the present image frame, so it takes more hardware resource. Therefore, neither the 3DNR and 2DNR methods can effectively reduce the noises without respect to a static or a dynamic image frame.

Therefore, the invention provides a noise reduction device and a method for reducing noises of a video sequence, further solving the aforesaid problems.

SUMMARY OF THE INVENTION

A scope of the invention provides a noise reduction device and method for adjusting gray levels of a video sequence, further reducing noises.

According to a preferred embodiment, a video sequence is inputted into a display system, the video sequence includes N image frames, each of the image frames is composed of T pixels, and each of the pixels has a gray level, therein both N and T are positive integers. The noise reduction device of the invention is applied in the display system and selectively adjusts the gray level of the jth pixel of the ith image frame, therein i is an integer from 2 through N, and j is an integer from 1 through T. The gray levels of the (i−1)th image frames of the video sequence are already adjusted and stored in a buffer of the display system.

The noise reduction device of the invention includes a motion detector and a first noise reduction module. The motion detector is used to determine whether the jth pixel is a motion pixel or a static pixel. If the jth pixel is a motion pixel, the first noise reduction module directly stores the gray level of the jth pixel without adjustment into the buffer, and if the jth pixel is a static pixel, the first noise reduction module adjusts the gray level of the jth pixel by the following formula:

$$GL_{new}=(GL_{j,i-1}*W+GL_{j,i})/(W+1),$$

therein $GL_{new}$ represents the adjusted gray level of the jth pixel, $GL_{j,i-1}$ represents the gray level of the jth pixel of the (i−1)th image frame, $GL_{j,i}$ represents the gray level of the jth pixel of the ith image frame, and W represents a weighting. The first noise reduction module stores the adjusted gray level ($GL_{new}$) of the jth pixel into the buffer.

Therefore, the noise reduction device and method of the invention divide pixels of an image frame into motion pixels and static pixels. If a pixel is a motion pixel, a gray level of the pixel is directly outputted without adjustment. If a pixel is a static pixel, a gray level of the pixel is adjusted according to previous image frame. Therefore, ghost can be avoided. Furthermore, the invention needs to store only the previous image frame, without utilizing multiple continuous image frames to adjust the present image frame. Therefore, a display system of the invention needs only to be installed with one buffer, and hardware resource can be further saved.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
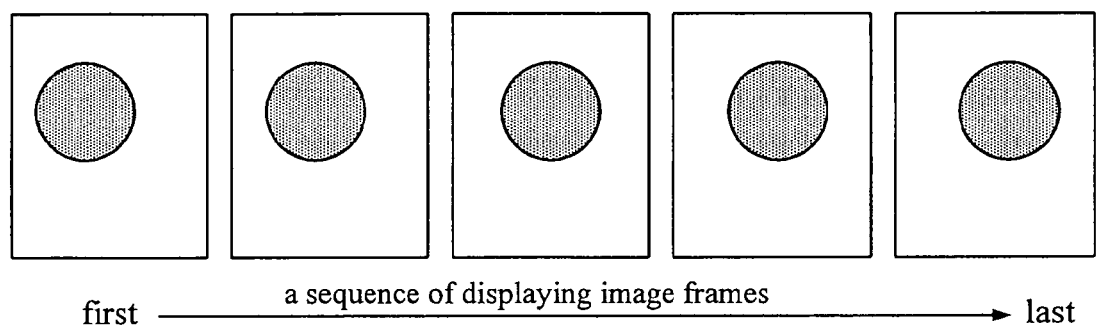
FIG. 1A is a schematic diagram illustrating five continuous image frames of a video sequence.
Figure 1B:
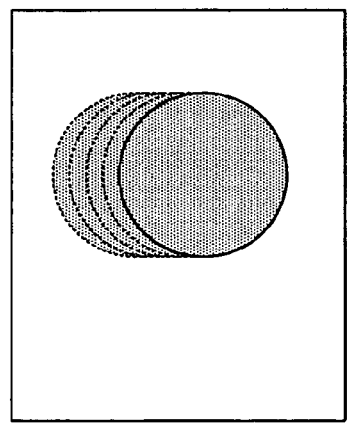
FIG. 1B is a schematic diagram illustrating an image frame superposed by five image frames shown in FIG. 1A.
Figure 2:
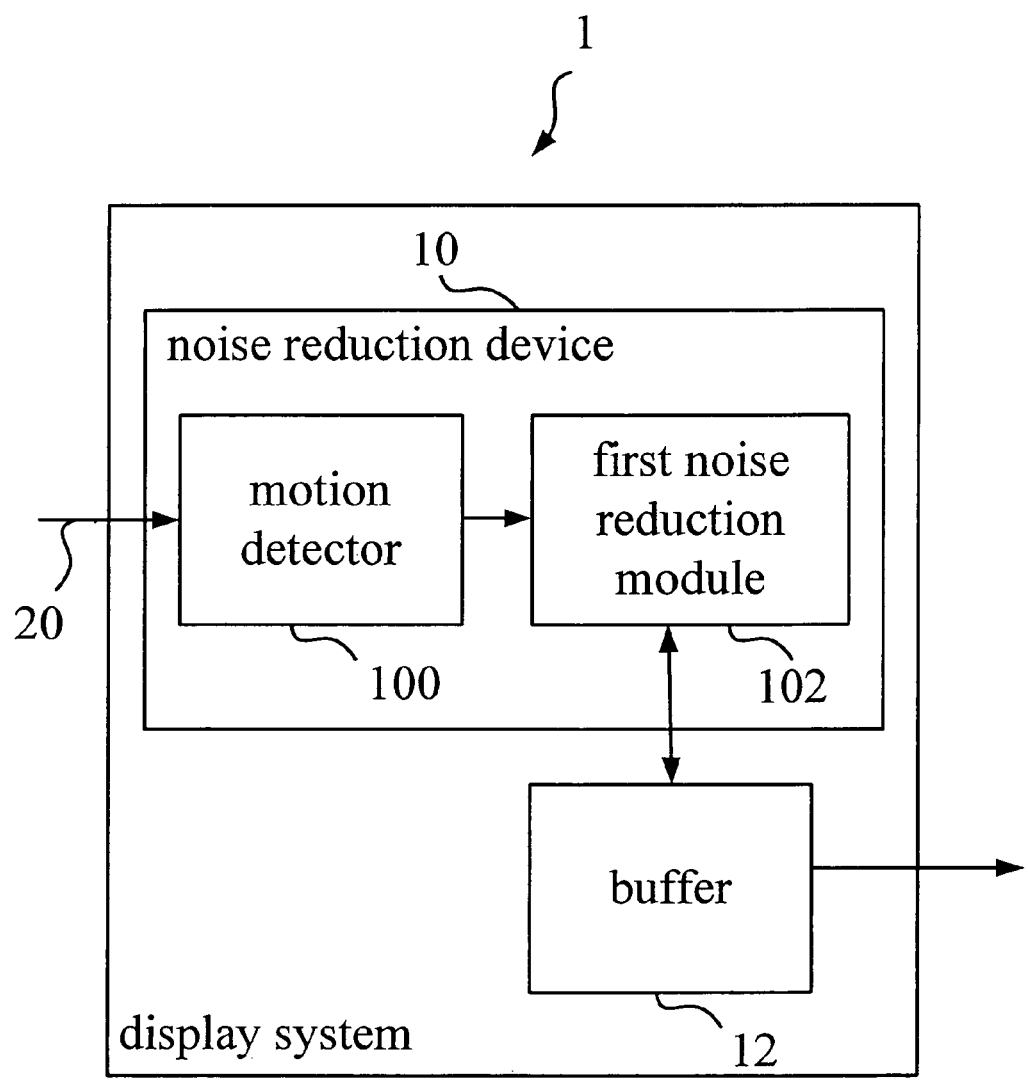
FIG. 2 is a schematic diagram illustrating a display system including a noise reduction device according to an embodiment of the invention.

Please refer to FIG. 2. FIG. 2 is a schematic diagram illustrating a display system 1 including a noise reduction device 10 according to an embodiment of the invention. The display system 1 includes the noise reduction device 10 and a buffer 12. The noise reduction device 10 includes a motion detector 100 and a first noise reduction module 102.

According to the embodiment, a video sequence is inputted into the display system 1, the video sequence includes N image frames 20, each of the image frames 20 is composed of T pixels, and each of the pixels has a gray level, therein both N and T are positive integers. The motion detector 100 is used for determining whether the inputted pixel is a motion pixel or a static pixel. The first noise reduction module 102 is used for selectively adjusting gray levels of pixels of the image frame 20.

Figure 3:
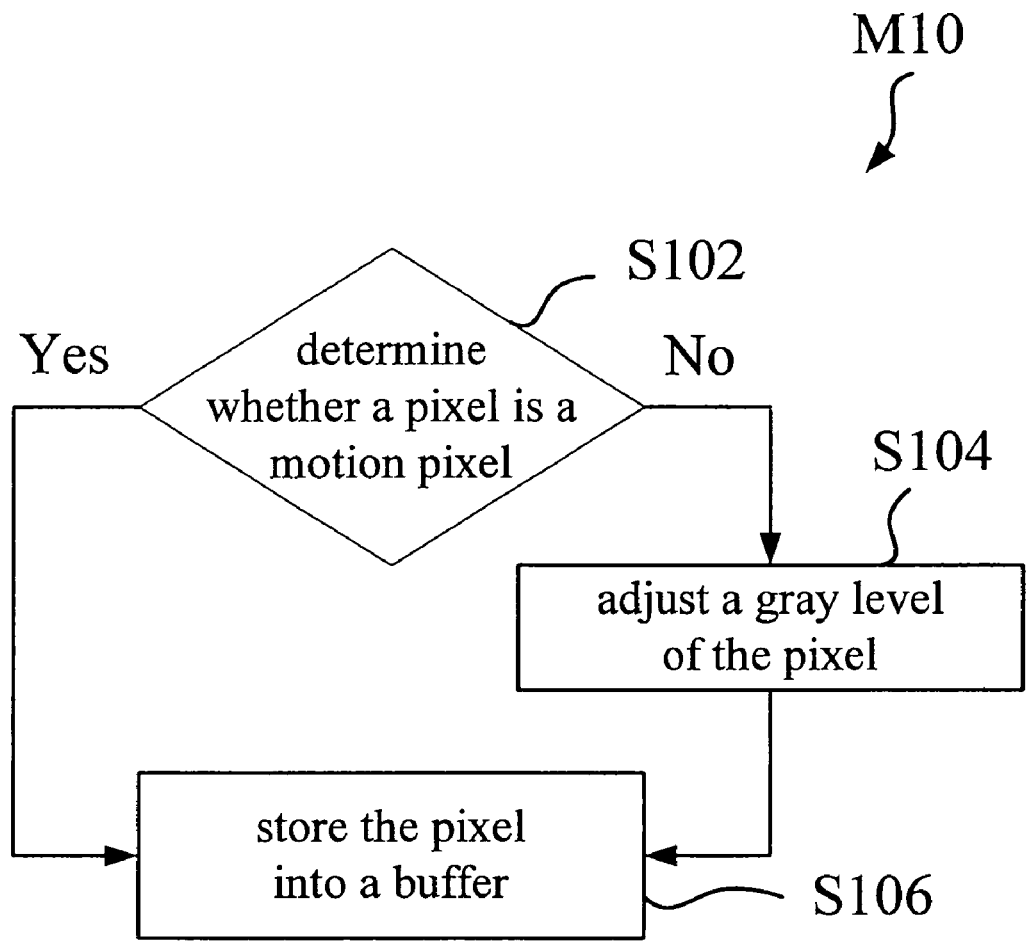
FIG. 3 is a flow chart of a noise reduction method according to an embodiment of the invention.

Please refer to FIG. 2 and FIG. 3. FIG. 3 is a flow chart of a noise reduction method M10 according to an embodiment of the invention. The noise reduction method M10 of the invention is applied in the display system 1 and selectively adjusts the gray level of the jth pixel of the ith image frame, therein i is an integer from 2 through N, and j is an integer from 1 through T. The gray levels of the (i−1)th image frame of the video sequence are already adjusted and stored in a buffer 12 of the display system 1. The noise reduction method M10 includes the following steps.

At first, the step S102 is performed to determine whether the jth pixel is a motion pixel according to the following inequality (1). If the inequality (1) is true, the jth pixel is judged as a motion pixel; if the inequality (1) is false, the jth pixel is judged as a static pixel.

$$|GL_{j,i,m*n} - GL_{j,i-1,m*n}| > Th1, \quad \text{Inequality (1)}$$

therein $GL_{j,i,m*n}$ represents a sum of the gray levels of a m*n block including the jth pixel of the ith image frame, $GL_{j,i-1,m*n}$ represents a sum of the gray levels of the m*n block including the jth pixel of the (i−1)th image frame, and Th1 represents a first threshold, therein m and n are positive integers.

If the jth pixel is a motion pixel, the step S106 is performed to directly store a gray level of the jth pixel without adjustment into the buffer 12.

If the jth pixel is a static pixel, the step S104 is performed to adjust a gray level of the jth pixel according to the following formula (1). The step S106 is then performed to store the adjusted jth pixel into the buffer 12.

$$GL_{new} = (GL_{j,i-1}*W + GL_{j,i})/(W+1), \quad \text{Formula (1)}$$

therein $GL_{new}$ represents the adjusted gray level of the jth pixel, $GL_{j,i-1}$ represents the gray level of the jth pixel of the (i−1)th image frame, $GL_{j,i}$ represents the gray level of the jth pixel of the ith image frame, and W represents a weighting.

Figure 4:
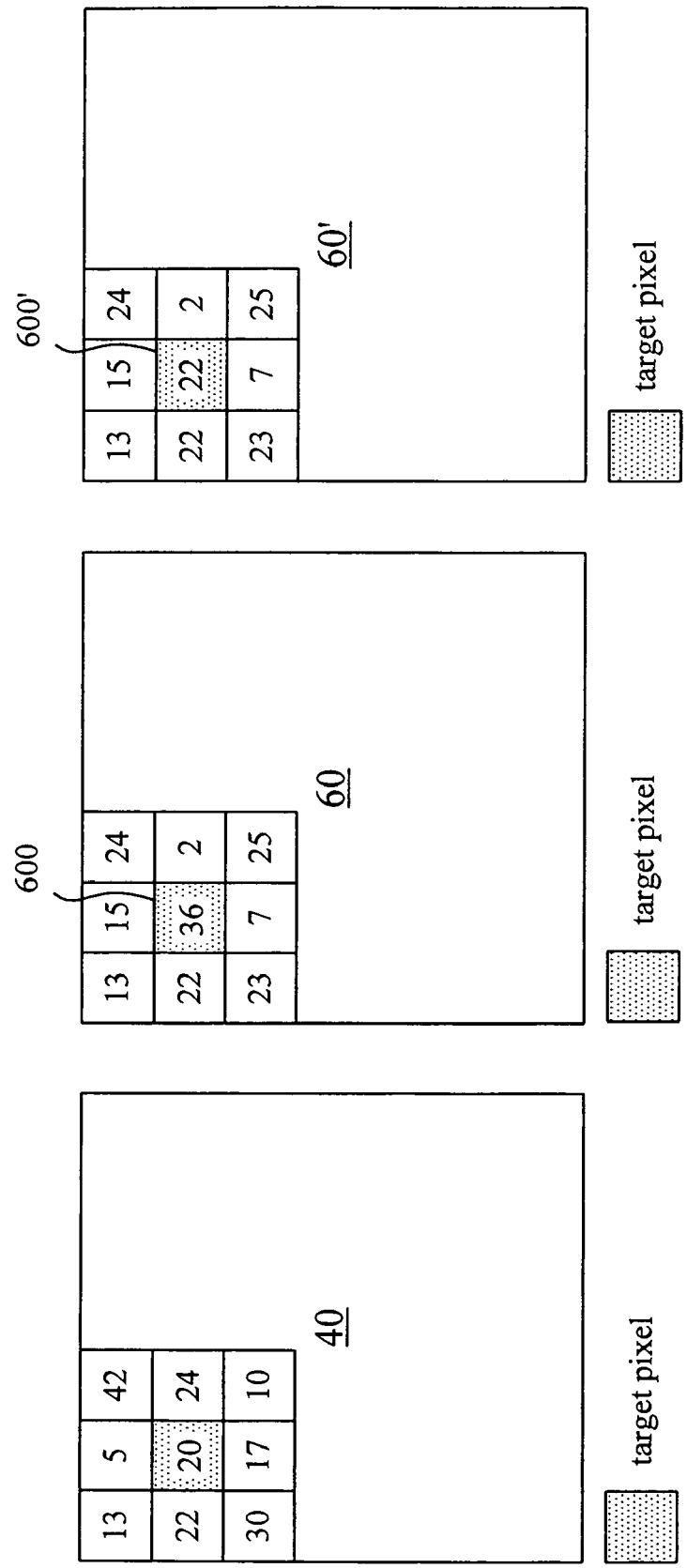
FIG. 4 is a schematic diagram illustrating the present image frame, previous image frame, and an image frame after being adjusted by the noise reduction method of the invention.

For example, please refer to FIG. 4. FIG. 4 is a schematic diagram illustrating the present image frame 60, previous image frame 40, and an image frame 60' after being adjusted by the noise reduction method of the invention. Assume that the first threshold Th1 is 30, both m and n is 3, and the weight W is 7 as an example.

At first, according the aforesaid inequality (1), |(13+15+24+22+36+2+23+7+25)−(13+5+42+22+20+24+30+17+10)|=16<30 (the first threshold), the target pixel 600 is determined to be a static pixel. Further, according to the aforesaid formula (1), (20*7+36)/(7+1)=22, a gray level of the target pixel 600 is adjusted from 36 to 22, shown as the target pixel 600' in FIG. 4.

Accordingly, noises of an image frame can be effectively reduced. The invention needs to store previous image frame only, without utilizing multiple continuous image frames to adjust the present image frame. Therefore, the display system of the invention only needs to be installed with one buffer, and further hardware resource can be saved.

Figure 5:
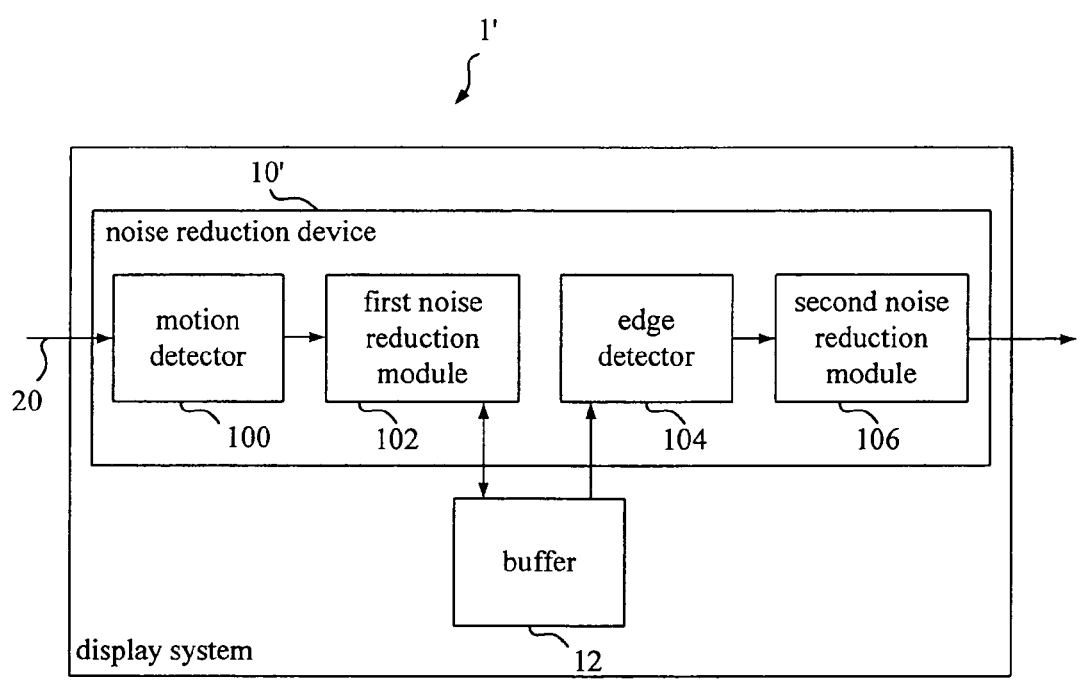
FIG. 5 is a schematic diagram illustrating a display system including a noise reduction device according to another embodiment of the invention.

Please refer to FIG. 5. FIG. 5 is a schematic diagram illustrating a display system 1' including a noise reduction device 10' according to another embodiment of the invention. The main difference between the display systems 1' and 1 is the noise reduction device 10' further including an edge detector 104 and a second noise reduction module 106. The edge detector 104 is used for determining whether an inputted pixel is an edge pixel or a background pixel. The second noise reduction module 106 is used for selectively adjusting a gray level of an edge pixel or a background pixel.

Figure 6:
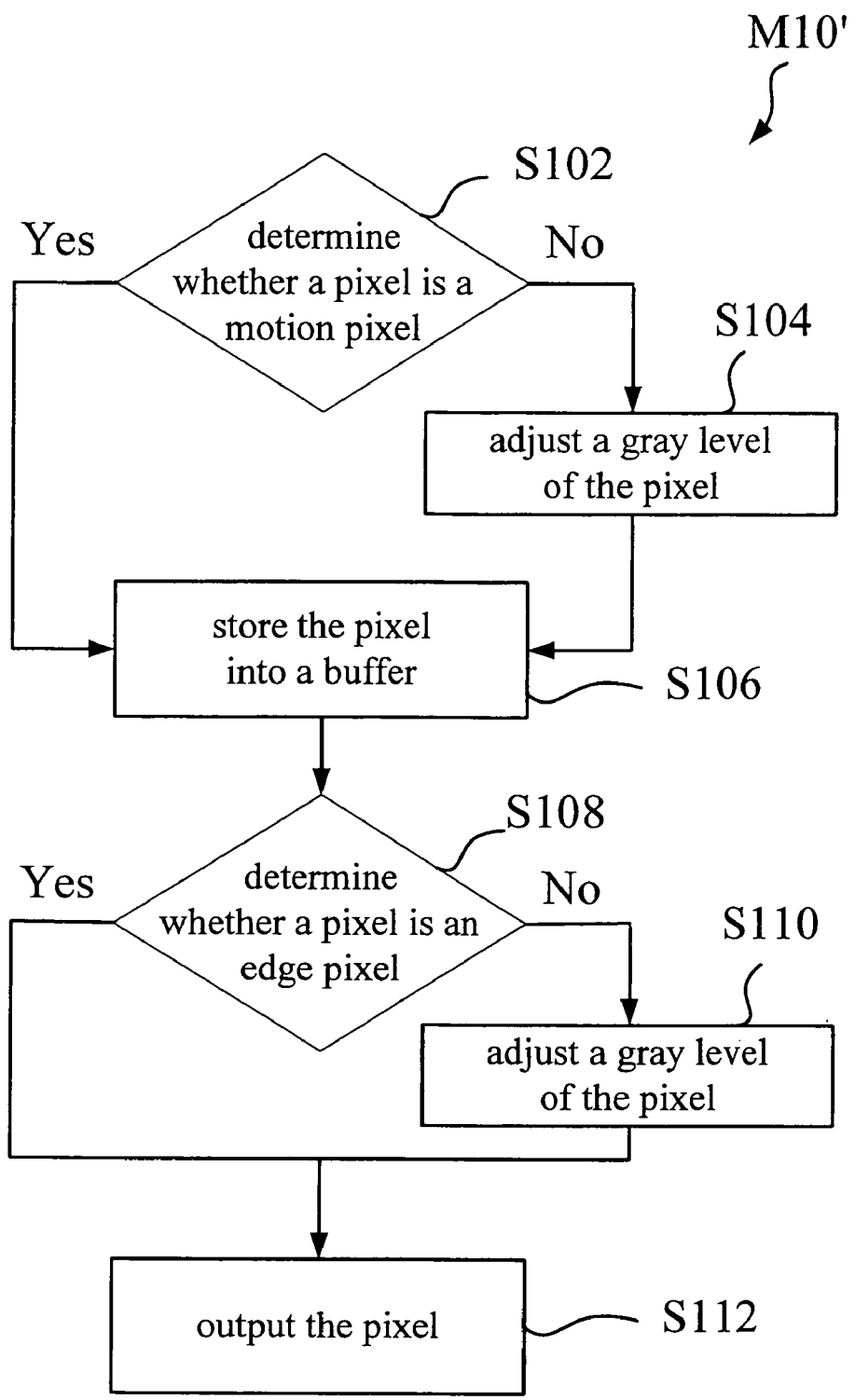
FIG. 6 is a flow chart of a noise reduction method according to another embodiment of the invention.

Please refer to FIG. 5 and FIG. 6. FIG. 6 is a flow chart of a noise reduction method M10' according to another embodiment of the invention. The main difference between the noise reduction methods M10' and M10 is shown in the steps S108~S102. The noise reduction method M10' of the invention includes the following steps.

At first, the steps S1102~S106 are performed. The steps S1102~S106 are shown in the noise reduction method M10 and will not be described here again.

Afterward, the step S108 is performed to determine whether the jth pixel is an edge pixel according to the following inequality (2). If the following inequality (2) is true, the jth pixel is judged as an edge pixel. Or, the jth pixel is judged as a background pixel.

$$GL\_max_{j,i,p*q} - GL\_min_{j,i,p*q} > Th2, \quad \text{Inequality (2)}$$

therein $GL\_max_{j,i,p*q}$ represents a maximum gray level of a p*q block including the jth pixel of the ith image frame, $GL\_min_{j,i,p*q}$ represents a minimum gray level of the p*q block including the jth pixel of the ith image frame, and Th2 represents a second threshold, therein p and q are positive integers.

If the jth pixel is an edge pixel, the step S112 is performed to directly output the pixel without adjustment.

If the jth pixel is a background pixel, the step S110 is performed to adjust a gray level of the jth pixel according to a filtering algorithm. The step S112 is then performed to output the pixel. The filtering algorithm is one selected from the group consisting of a median filtering algorithm, a smooth algorithm, and an open-close and close-open (OCCO) algorithm. The aforesaid filtering algorithms can be easily applied by one skilled in the art, so the related description will not be mentioned here again.

For example, please refer to the target pixel 600' of the image frame 60' in FIG. 4 and assume that the second threshold Th2 is 10. The maximum gray level of a 3*3 block including the target pixel 600' is 25, and the minimum gray level is 2. According to the aforesaid inequality (2), (25−2)=23>10 (the second threshold), the target pixel 600' is determined to be an edge pixel and then is directly outputted without adjustment.

Compared with prior art, the noise reduction device and method of the invention divide pixels of an image frame into motion pixels and static pixels, and further selectively adjust gray levels of the pixels. Therefore, ghosts can be avoided. Further, the invention does not need to utilize multiple continuous image frames to adjust the present image frame, so the hardware resource can be saved. Additionally, the invention divides the pixels of an image frame into edge pixels and background pixels, and further selectively adjusts gray levels of the pixels. Therefore, the clearness of the image can be enhanced, and alternatively the blurriness of the image is reduced. As a whole, the noise reduction device of the invention can effectively reduce noises of a video sequence, and the hardware resource can be further saved.

With the example and explanations above, the features and spirits of the invention will be hopefully well described. Those skilled in the art will readily observe that numerous modifications and alterations of the device may be made while retaining the teaching of the invention. Accordingly, the disclosure above should be construed as limited only by the metes and bounds of the appended claims.

What is claimed is:

1. A noise reduction device, a video sequence being inputted into a display system, the video sequence comprising N image frames, each of the image frames being composed of T pixels, each of the pixels having a gray level, N and T being positive integers, the noise reduction device being applied in the display system and selectively adjusting the gray level of the jth pixel of the ith image frame, i being an integer from 2 through N, j being an integer from 1 through T, the gray levels of the (i−1)th image frame of the video sequence already being adjusted and stored in a buffer of the display system, the noise reduction device comprising:
- a motion detector, for determining whether the jth pixel is a motion pixel or a static pixel; and
- a first noise reduction module, if the jth pixel is a motion pixel, the first noise reduction module directly storing the gray level of the jth pixel without adjustment into the buffer, if the jth pixel is a static pixel, the first noise reduction module adjusting the gray level of the jth pixel by the following formula:

$$GL_{new}=(GL_{j,i-1}*W+GL_{j,i})/(W+1),$$

wherein $GL_{new}$ represents the adjusted gray level of the jth pixel, $GL_{j,i-1}$ represents the gray level of the jth pixel of the (i−1)th image frame, $GL_{j,i}$ represents the gray level of the jth pixel of the ith image frame, W represents a weighting, and the first noise reduction module stores the adjusted gray level ($GL_{new}$) of the jth pixel into the buffer.

2. The noise reduction device of claim 1, wherein when the following inequality is true, the motion detector determines that the jth pixel is a motion pixel:

$$|GL_{j,i,m*n}-GL_{j,i-1,m*n}|>Th1,$$

wherein $GL_{j,i,m*n}$ represents a sum of the gray levels of a m*n block comprising the jth pixel of the ith image frame, $GL_{j,i-1,m*n}$ represents a sum of the gray levels of the m*n block comprising the jth pixel of the (i−1)th image frame, Th1 represents a first threshold, and m and n are positive integers.

3. The noise reduction device of claim 1, further comprising:
- an edge detector, for determining whether the jth pixel is an edge pixel or a background pixel; and
- a second noise reduction module, if the jth pixel is an edge pixel, the second noise reduction module directly outputting the gray level of the jth pixel without adjustment, if the jth pixel is a background pixel, the second noise reduction module adjusting the gray level of the jth pixel by a filtering algorithm and then outputting the adjusted gray level of the jth pixel.

4. The noise reduction device of claim 3, wherein when the following inequality is true, the edge detector determines that the jth pixel is an edge pixel:

$$GL\_max_{j,i,p*q}-GL\_min_{j,i,p*q}>Th2,$$

wherein $GL\_max_{j,i,p*q}$ represents a maximum gray level of a p*q block comprising the jth pixel of the ith image frame, $GL\_min_{j,i,p*q}$ represents a minimum gray level of the p*q block comprising the jth pixel of the ith image frame, Th2 represents a second threshold, and p and q are positive integers.

5. The noise reduction device of claim 3, wherein the filtering algorithm is one selected from the group consisting of a median filtering algorithm, a smooth algorithm, and an open-close and close-open (OCCO) algorithm.

6. The noise reduction device of claim 1, wherein the weighting is 7.

7. An noise reduction method, a video sequence being inputted into a display system, the video sequence comprising N image frames, each of the image frames being composed of T pixels, each of the pixels having a gray level, N and T being positive integers, the noise reduction method being applied in the display system and selectively adjusting the gray level of the jth pixel of the ith image frame, i being an integer from 2 through N, j being an integer from 1 through T, the gray levels of the (i−1)th image frame of the video sequence having already been adjusted and stored in a buffer of the display system, the noise reduction method comprising the following steps of:
- (a) determining whether the jth pixel is a motion pixel, if YES, performing step (b1), if NO, performing step (b2);
- (b1) directly storing the gray level of the jth pixel without adjustment into the buffer; and
- (b2) adjusting the gray level of the jth pixel by the following formula:

$$GL_{new}=(GL_{j,i-1}*W+GL_{j,i})/(W+1),$$

wherein $GL_{new}$ represents the adjusted gray level of the jth pixel, $GL_{j,i-1}$ represents the gray level of the jth pixel of the (i−1)th image frame, $GL_{j,i}$ represents the gray level of the jth pixel of the ith image frame, W represents a weighting, and the adjusted gray level ($GL_{new}$) of the jth pixel is stored into the buffer.

8. The noise reduction method of claim 7, wherein in the step (a), when the following inequality is true, the jth pixel is determined to be a motion pixel:

$$|GL_{j,i,m*n}-GL_{j,i-1,m*n}|>Th1,$$

wherein $GL_{j,i,m*n}$ represents a sum of the gray levels of a m*n block comprising the jth pixel of the ith image frame, $GL_{j,i-1,m*n}$ represents a sum of the gray levels of the m*n block comprising the jth pixel of the (i−1)th image frame, Th1 represents a first threshold, and m and n are positive integers.

9. The noise reduction method of claim 7, further comprising the following steps of:
- (c) determining whether the jth pixel is an edge pixel, if YES, performing step (d1), if NO, performing step (d2);
- (d1) directly outputting the gray level of the jth pixel without adjustment; and
- (d2) adjusting the gray level of the jth pixel by a filtering algorithm, and then outputting the adjusted gray level of the jth pixel.

10. The noise reduction method of claim 9, wherein in the step (c), when the following inequality is true, the jth pixel is determined to be an edge pixel:

$$GL\_max_{j,i,p*q}-GL\_min_{j,i,p*q}>Th2,$$

wherein $GL\_max_{j,i,p*q}$ represents a maximum gray level of a p*q block comprising the jth pixel of the ith image frame, $GL\_min_{j,i,p*q}$ represents a minimum gray level of the p*q block comprising the jth pixel of the ith image frame, Th2 represents a second threshold, and p and q are positive integers.

11. The noise reduction method of claim 9, wherein the filtering algorithm is one selected from the group consisting of a median filtering algorithm, a smooth algorithm, and an open-close and close-open (OCCO) algorithm.

12. The noise reduction method of claim 7, wherein in the step (b2), the weighting is 7.

* * * * *